(12) United States Patent
Omata et al.

(10) Patent No.: US 6,477,530 B1
(45) Date of Patent: Nov. 5, 2002

(54) DIGITAL DATA RECORDING AND REPRODUCING SYSTEM

(75) Inventors: Yoshinobu Omata, Hachioji (JP); Takashi Kondoh, Chofu (JP)

(73) Assignee: Olympus Optical Co., Ltd., Tokyo (JP)

( * ) Notice: Subject to any disclaimer, the term of this patent is extended or adjusted under 35 U.S.C. 154(b) by 244 days.

(21) Appl. No.: 09/618,820

(22) Filed: Jul. 18, 2000

(30) Foreign Application Priority Data

Jul. 22, 1999 (JP) .......................................... 11-207982

(51) Int. Cl.[7] .............................................. G06F 17/30
(52) U.S. Cl. .......................... 707/9; 707/101; 707/104; 707/201; 707/204; 713/200
(58) Field of Search ................................ 707/9, 1, 101, 707/10, 102, 104, 200, 201, 204; 705/1, 51; 700/9; 711/112; 713/189, 200, 159; 369/53.21, 275

(56) References Cited

U.S. PATENT DOCUMENTS

| | | | |
|---|---|---|---|
| 5,469,564 A | * 11/1995 | Junya | 711/164 |
| 5,535,188 A | * 7/1996 | Dang et al. | 369/275.2 |
| 5,629,981 A | * 5/1997 | Nerlikar | 340/10.31 |
| 5,671,202 A | * 9/1997 | Brownstein et al. | 235/462.03 |
| 5,859,968 A | * 1/1999 | Brown et al. | 713/200 |
| 5,918,222 A | * 6/1999 | Fukui et al. | 704/251 |
| 5,940,516 A | * 8/1999 | Mason et al. | 713/159 |

OTHER PUBLICATIONS

A. Kokubu et al; "Development of an Authenicated Secure Electronic Storage System" (A Meeting for final reports on a project supporting creative software, and a project promoting electric commerce, 1998) Abstract Only (No Translation of Entire Document).

* cited by examiner

Primary Examiner—Sanjiv Shah
(74) Attorney, Agent, or Firm—Frishauf, Holtz, Goodman & Chick, P.C.

(57) ABSTRACT

A digital data recording and reproducing system comprises a data input part and a data output part. Input data is manipulated through a computer system unit. The computer system unit comprises at least one of: a data retention part to store the digital data, a personal identification part to verify whether a user operating the digital data recording and reproducing system is authorized or not, an access log recording part to record that the user has accessed the data retention part, a falsification detection part to detect whether data stored in the data retention part is falsified or not, and a history data recording part to record information on changes or corrections in the data retention part. The computer system unit further comprises a control part which controls parts by giving operation instructions to the parts which the computer system unit comprises as the component parts, the parts including at least one of the data retention part, the personal identification part, the access log recording part, the falsification detection part, the history data recording part, the attribute control part and an execution decision part.

14 Claims, 12 Drawing Sheets

DIGITAL DATA RECORDING AND REPRODUCING SYSTEM

CROSS-REFERENCE TO RELATED APPLICATIONS

This application is based upon and claims the benefit of priority from the prior Japanese Patent Application No. 11-207982, filed Jul. 22, 1999, the entire contents of which are incorporated herein by reference.

BACKGROUND OF THE INVENTION

The present invention relates to a digital data recording and reproducing system, and, more particularly, to a digital data recording and reproducing system to retain digital data, for example, on removable and rewritable recording media such as a magnet-optical disk.

In recent years, with spread of electronic computers such as personal computers, various kinds of information have been retained in a recording medium as digital data.

However, as the digital data used in the computers may be easily copied and falsified in general, there has been a serious problem from a viewpoint of data protection and data security.

In order to solve such problems, two electronic computers are connected in a network such as a LAN, while they function as a retention device and a host device respectively, in a recent development project "Development of an electronic retention system for original documents with copying prevention" (A meeting for final reports on a project supporting creative software, and a project promoting electric commerce, 1998).

The above retention device denotes a device actually retaining data, and may be expressed as a server in a network computing terminology.

Moreover, the above host device functions as a terminal for user use, and may correspond to a client in terms of the network computing terminology.

In other words, the data confidentiality has been improved by configuration of a client/server system in the network with limitation on access to data.

However, at least two, or more than two electric computers are required for configuration of the client/server system comprising the above data retention device and the above host device on a network. Then, there has been a problem that the above system is very expensive system to require much high cost at introduction of the system.

In addition, the client/server system comprising the above data retention device and the host device may not be operated, or may require further cost for installing a new network devices, if no network devices previously provided.

BRIEF SUMMARY OF THE INVENTION

The present invention has been made based on the above circumstances, and the object of the present invention is to offer a digital data recording and reproducing system which may function as a low-cost data retention device with easy operation even under no network devices.

In order to achieve the above object, the present invention provides a digital data recording and reproducing system comprising:

a data input part to input digital data;

a computer system unit manipulating data input through the data input part as digital data therein; and a data output part to output digital data manipulated within the computer system unit, wherein the computer system unit comprises at least one of:

a data storage or retention part to store digital data;

a personal identification part to verify whether a user operating the digital data recording and reproducing system is authorized or not;

an access log recording part to record that the user have accessed the data retention part;

a falsification detection part to detect whether data stored in the data retention part is falsified or not;

a history data recording part to record information on changes or corrections in data stored in the data retention part; and an attribute control part to control attributes of data stored in the data retention part, and the computer system unit further comprises:

a control part to control parts by giving operation instructions to the parts which the computer system unit comprises as component parts, the parts including at least one of the data retention part, the personal identification part, the access log recording part, the falsification detection part, the history data recording part, and the attribute control part; and an execution decision part to decide where an environment, in which the operation instructions by the control part to the each parts are executed, is an authorized one or not.

The "environment" denotes both a hardware one, and a software one. The most important environment to be decided is the software environment, that is programs themselves.

And, the present invention provides a digital data recording and reproducing system according to the above system further comprising a protection part connected to the computer system unit, wherein the protection part comprises a read only nonvolatile memory retaining a host identifier to guarantee that the environment in which the operation control instructions are executed is an authorized one, and wherein the execution decision part decides whether the environment in which the operation control instructions are executed is an authorized one or not by acquiring the host identifier retained in the read only nonvolatile memory through communication with the protection part.

Further, the present invention provides a digital data recording and reproducing system according to the above system, wherein the execution decision part performs decision in a processing part provided in the computer system unit by reading out the host identifier to guarantee that the environment in which the operation instructions previously written in are executed is an authorized one.

And, the present invention provides a digital data recording and reproducing system according to the above system, wherein the execution decision part comprises a plurality of independent host identifier reading parts. And, the present invention provides a digital data recording and reproducing system according to the above system, wherein the independent host identifier reading parts verify each other by mutual verification that they are authorized host identifier reading parts.

And, the present invention provides a digital data recording and reproducing system according to the above system, wherein the personal identification part comprises:

an IC card having identification information written therein; and an IC card readout part to read out the identification information written in the IC card, and wherein encryption communication is used for communication between the personal identification part and the IC card readout part.

And, the present invention provides a digital data recording and reproducing system according to the above system, wherein the personal identification part comprises:

a physiological information input part to input physiological information, and wherein personal identification is performed based on the physiological information input by the physiological information input part.

And, the present invention provides a digital data recording and reproducing system according to the above system, wherein the falsification detection part comprises a collate part to collate a collate code obtained by decryption of electronic signatures recorded for each data file in the data retention part connected to the computer system unit; with a collate code calculated based on a predetermined calculation method using each data file in the data retention part.

And, the present invention provides a digital data recording and reproducing system according to the above system, wherein the falsification detection part comprises a collate part to collate a collate code obtained by decryption of electronic signatures recorded for each data file in the data retention part connected to the computer system unit; with a collate code made based on all the data files retained in the data retention part.

And, the present invention provides a digital data recording and reproducing system according to the above system, wherein the access log recording part records in the data retention part:

start or end time of accesses; a user name to identify the user; and a classification sign denoting the start or the end time of the accesses.

And, the present invention provides a digital data recording and reproducing system according to the above system, wherein the history data recording part records in the data retention part:

a user name to identify the user as history data; time of the accesses showing when the accesses occur; an access type denoting the type of operation made by the user; and a retention device identifier to specify a retention device used.

And, the present invention provides a digital data recording and reproducing system according to the above system, wherein the control part further comprises:

an I/O control part for access to data on a retention medium in the data retention part, and wherein the I/O control part comprises:

a retention medium identification part to identify the retention medium;

an encryption part to encrypt data information;

a decryption part to decrypt encrypted data.

And, the present invention provides a digital data recording and reproducing system according to the above system, wherein the encryption and decryption parts may respectively control an encryption level by a hierarchical structure.

And, the present invention provides a digital data recording and reproducing system according to the above system, wherein the attribute control part controls:

an original identifier showing that data is original at least as attribute data; and a backup identifier showing that data is backup data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
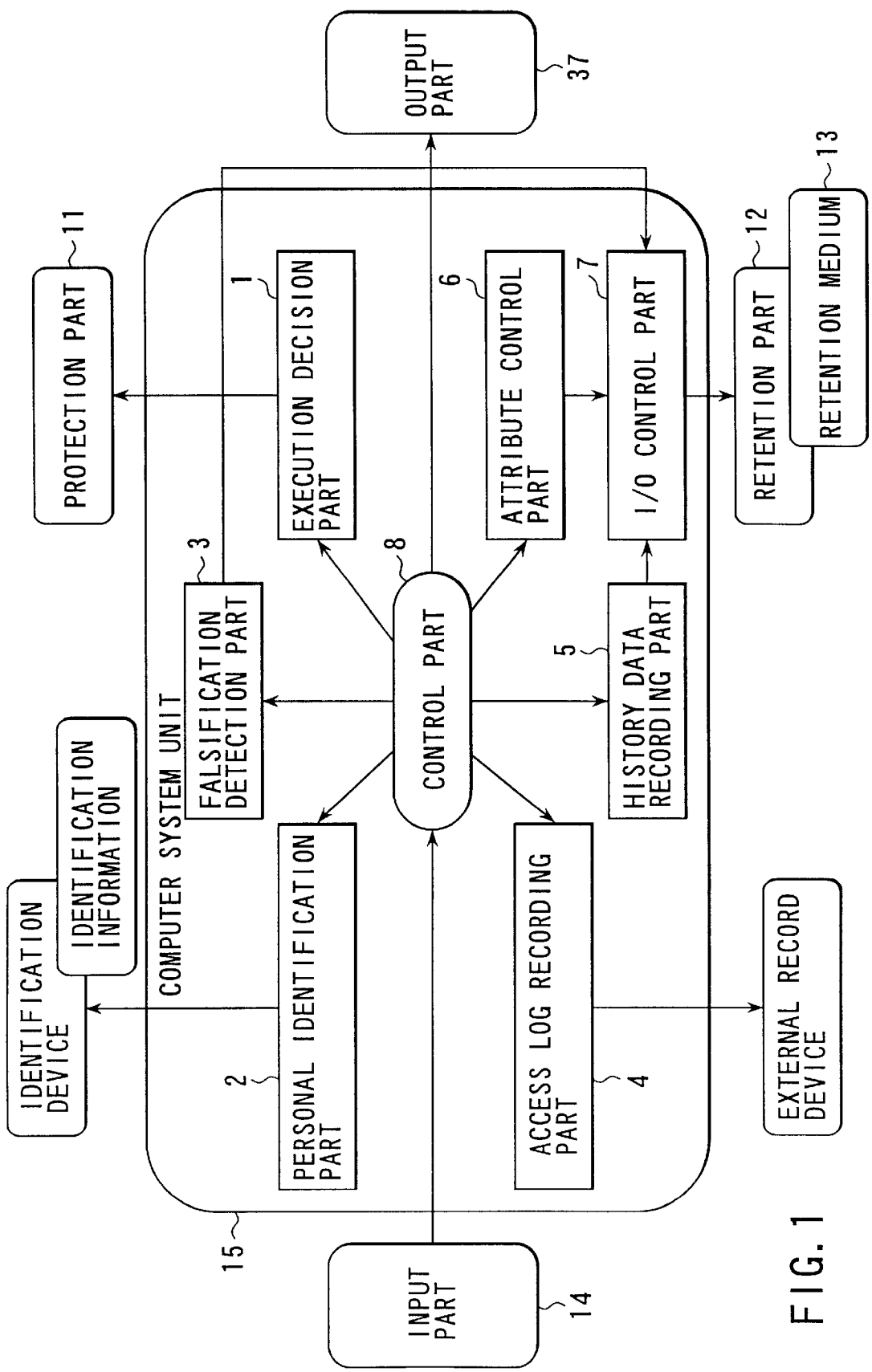
FIG. 1 is a block diagram showing a configuration of a digital data recording and reproducing system according to one of embodiments of the present invention.

Reference will now be made in detail to the presently preferred embodiments of the invention as illustrated in the accompanying drawings, in which like reference numerals designate like or corresponding parts.

Embodiments of the present invention will be described below, referring to attached drawings.

FIG. 1 is a block diagram showing a configuration of a digital data recording and reproducing system according to one of embodiments of the present invention.

That is, as shown in FIG. 1, the digital data recording and reproducing system comprises: a data input part 14 including an input means such as a keyboard; a computer system unit 15 such as a personal computer (PC); and a data output part 37 containing a display means such as a display. In the system, data input through the above data input part 14 is configured to be manipulated as digital data in the above computer system unit 15, and to be output from the above data output part 37.

The above computer system unit 15 of the present digital data recording and reproducing system is connected to a data retention part 12 to store digital data through an I/O control part 7.

And, the above computer system unit 15 comprises: a personal identification part 2 to verify whether a user operating the above digital data recording and reproducing system is authorized or not; an access log recording part 4 to record that the above user have accessed the above data retention part 12; a falsification detection part 3 to decide through the I/O control part 7 whether data stored in the above data retention part 12 is falsified or not; a history data recording part 5 to record information on changes or corrections in data stored in the above data retention part 12 through the I/O control part 7; and an attribute control part 6 to control attributes of the data stored in the above data retention part 12 through the I/O control part 7.

And, the above computer system unit 15 comprises: a control part 8 to control of operation of each part by giving operation instructions to the each part of the above data retention part 12, the above personal identification part 2, the access log recording part 4, the falsification detection part 3, the history data recording part 5, and the attribute control part 6; and an execution decision part 1 to decide whether the environment in which operation control instructions to each part are executed by the above control part 8 is an authorized one or not.

Moreover, the digital data recording and reproducing system further comprises a protection part 11 connected to the above computer system unit 15.

In FIG. 1, the data retention part 12 to store digital data is configured to be connected to the computer system unit 15 through the I/O control part 7, as described, but, the data retention part 12 may be provided in the computer system unit.

In the present digital data recording and reproducing system, based on operation control instructions by the above control part 8 to each part which the above data retention part 12 and the above computer system unit 15 comprise, data input by the above data input part 14 is manipulated as digital data in the above computer system unit 15 to be processed in a predetermined operations including retaining in the above data retention part 12, and, when the manipulated data is output from the above data output part 37 as required, the above execution decision part 1 is configured to decide in cooperation of the protection part 11 connected the above computer system unit 15 whether the environment in which operation control instructions to each part are executed by the above control part 8 is an authorized one or not.

Thereafter, when the above execution decision part 1 decides in cooperation of the protection part 11 connected the above computer system unit 15 that the environment in which operation control instructions to each part are executed by the above control part 8 is an authorized one, processing at each part by the above computer system unit 15 is continued. When it is decided not an authorized environment, the processing at each part by the above computer system unit 15 is terminated.

In this case, as described above, the above "environment" denotes both a hardware one, and a software one. The most important environment for the decision is the software environment, that is, programs themselves.

However, when it may be possible to internally decide in the above computer system unit 15 whether the environment in which operation control instructions to each part are executed by the above control part 8 is an authorized one or not, there is no cooperation required between the above computer system unit 15 and the protection part 11 connected to the above unit 15.

Each part which the above computer system unit 15 comprises includes at least one of the above personal identification part 2, access log recording part 4, falsification detection part 3, history data recording part 5, and attribute control part 6.

Therefore, in the present digital data recording and reproducing system, it is possible to easily obtain substantially similar function to that of an electronic retention system for original documents with copying prevention at low cost without more reliable data security by limitation on access to data after constructing a client/server system on a network like the electronic retention system for original documents with copying prevention.

That is, the embodiment in FIG. 1 provides the digital data recording and reproducing system comprising the data input part 14, the computer system unit 15, and the data output part 37; data input through the above data input part 14 being manipulated as digital data in the above computer system unit 15 manipulating; wherein the above computer system unit 15 comprises at least one of the data retention part 12 to store digital data, the personal identification part 2 to verify whether a user operating the above digital data recording and reproducing system is authorized or not, the access log recording part 4 to record that the above user have accessed the above data retention part 12, the falsification detection part 3 to decide where data stored in above data retention part 12 is falsified or not, the history data recording part 5 to record information on changes or corrections in data stored in the above data retention part 12, the attribute control part 6 to control attributes of the data stored in the above data retention part 12; and the above computer system unit 15 further comprises a control part 8 to control the above parts by giving operation instructions to the above parts which the above computer system unit 15 comprises as component parts, the above parts including at least one of the above data retention part 12, the above personal identification part 2, the above access log recording part 4, the above falsification detection part 3, the above history data recording part 5, and the above attribute control part 6, and an execution decision part 1 to decide where an environment, in which the above operation instructions by the above control part 8 to the above each parts are executed, is an authorized one or not.

(Embodiments for execution decision by the execution decision part 1)

Now, there will be described embodiments of execution decision by the execution decision part 1 according to one of embodiments shown in FIG. 1.

(A first embodiment)

Figure 2:
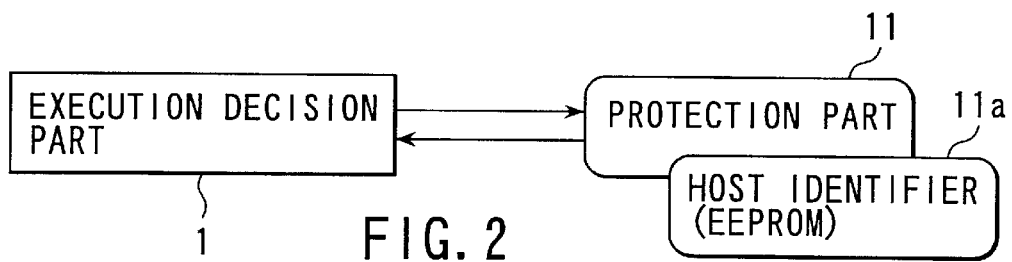
FIG. 2 is a block diagram showing a principal part of a first embodiment for execution decision by the execution decision part 1 in FIG. 1.

FIG. 2 is a block diagram showing a principal part of a first embodiment for execution decision by the execution decision part 1.

As shown in FIG. 2, the above execution decision part 1 decides whether the environment in which the above operation control instructions to each part are executed by the above control part 8 is an authorized one or not by acquiring the above host identifier 16 to guarantee that the environment in which the above operation control instructions, which are previously retained in the above read only nonvolatile memory (EEPROM, and the like) 11a of the protection part 11 connected to the above computer system unit 15, are executed is an authorized environment.

In this case, the host identifier 16 is unique data.

Firstly, the execution decision part 1 sends a request for acquisition of the host identifier to the protection part 11 connected to an I/O port of the above computer system unit T5.

According to the request, the protection part 11 sends the host identifier 16 to the execution decision part 1 after reading out the identifier retained in the read only nonvolatile memory 11a, when it is decided that the request for acquisition of the identifier from the decision part 1 is authorized.

For the above sending, a dedicated communication means is provided for sending and receiving of data between the execution decision part 1 and the protection part 11.

In the execution decision part 1, it is decided whether the received host identifier 16 is a correct identifier or not. The processing is continued at each part in the computer system unit 15, when it is decided that the identifier 16 is correct, and the processing at each part by the above computer system unit 15 is stopped. when it is decided that the identifier 16 is not correct.

That is, the above embodiment provides the digital data recording and reproducing system further comprising the protection part 11 connected to the above computer system unit 15, the above protection part 11 comprising the read only nonvolatile memory 11a retaining a host identifier 16 to guarantee that the environment in which the above operation control instructions are executed is an authorized environment, wherein the above execution decision part 1 decides whether the environment in which the above operation control instructions are executed is an authorized one or not by acquiring the above host identifier retained in the above read only nonvolatile memory 11a through communication with the above protection part 11.

(A second embodiment)

Figure 3:
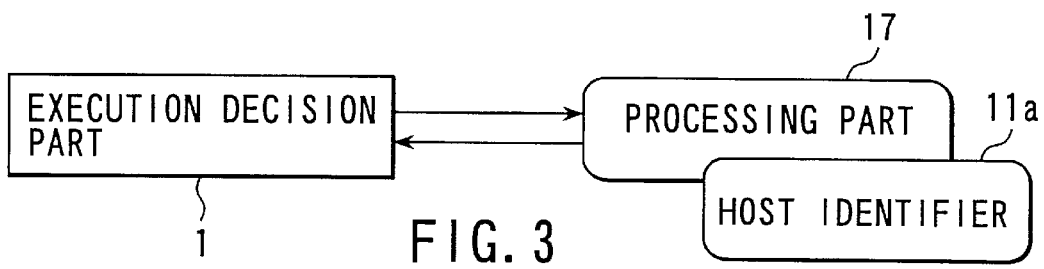
FIG. 3 is a block diagram showing a principal part of a second embodiment for execution decision by the execution decision part 1 in FIG. 1.

FIG. 3 is a block diagram showing a principal part of a second embodiment for execution decision by the execution decision part 1.

As shown in FIG. 3, the above execution decision part 1 decides whether the environment in which the above operation control instructions to each part are executed by the above control part 8 is an authorized one or not.

In this case, the host identifier 16 is unique data written in at manufacturing.

Firstly, the execution decision part 1 sends a request for acquisition of the host identifier to a processing part 17 provided in the above computer system unit 15.

In the processing part 17, the host identifier 16 is sent to the execution decision part 1, when the request from the execution decision part 1 is received, In the execution decision part 1, it is decided whether the received host identifier 16 is a correct identifier or not. The processing is continued at each part in the computer system unit 15 when it is decided that the identifier 16 is correct, and the processing at each part by the above computer system unit 15 is stopped. when it is decided that the identifier 16 is not correct.

That is, the above embodiment provides the digital data recording and reproducing system wherein the execution decision part 1 in the above digital data recording and reproducing system performs the decision by reading out the host identifier 16 to guarantee that the environment in which the above operation instructions previously written in the central processing unit 17 provided in the above computer system unit 11 are executed is an authorized one.

(A third embodiment)

Figure 4:
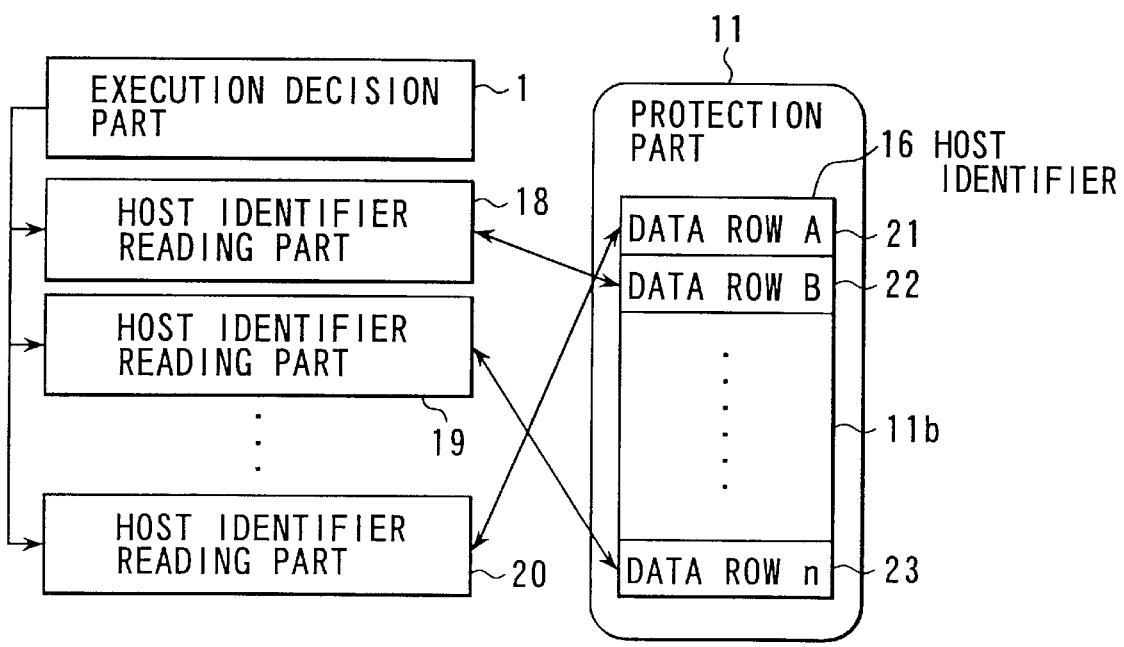
FIG. 4 is a block diagram showing a principal part of a third embodiment for execution decision by the execution decision part 1 in FIG. 1.

FIG. 4 is a block diagram showing a principal part of a third embodiment for execution decision by the execution decision part 1.

As shown in FIG. 4, the execution decision part 1 provided with "n" number of host identifier reading parts a–n (18–20) decides whether the environment in which the above operation control instructions to each part are executed by the above control part 8 is an authorized one or not by acquiring the host identifier 16 comprising data rows a–n (21–23) to guarantee that the environment in which the above operation instructions previously retained in the read only nonvolatile memory 11b of the protection part 11 connected to the above computer system unit 15.

In this case, the host identifiers 16 comprising the data rows a–n (21–23) are unique data, respectively.

Thereafter, the data rows a–n is formed by dividing the host identifier 16 into "n" number of pieces, and data rows are sequentially combined, from a data row, a data row b, . . . a data row n, to express one host identifier.

Firstly, the execution decision part 1 simultaneously boots up "n" number of the host identifier reading parts a–n (18–20).

The booted host identifier reading part 18–20 send a request for acquisition of data rows 21–23 of the host identifier 16 to the protection part 11 connected to the I/O port of the above computer system unit 15.

Before the above sending, the execution decision part 1 gives beforehand to each host identification reading parts 18–20 information on which data rows are read from the data rows 21–23 of the host identifier 16 for the side of the protection part 11.

The protection part 11 reads out and sends the data rows 21–23 corresponding to the host identification reading parts 18–20 from the read only nonvolatile memory 11b, according to which data rows 21–23 are required for the host identification reading part 18–20 in the acquisition request.

For the above sending, dedicated communication means is used for sending and receiving data between the execution decision part 1 and the protection part 11.

The host identifier reading part 18–20 sends the data rows 21–23 to the execution decision means 1 just after receiving the rows.

In the execution decision means 1, the data rows 21–23 are reconstructed to decide whether the received host identifier 16 is a correct identifier or not. The processing is continued at each part in the computer system unit 15 when it is decided that the identifier 16 is correct, and the processing at each part by the above computer system unit 15 is stopped, when it is decided that the identifier 16 is not correct.

Thereby, in the third embodiment, prevention performance against the reverse engineering is improved by simultaneous access and shifting of the order of the data rows.

That is, the above embodiment provides the digital data recording and reproducing system wherein the above execution decision part 1 is provided with a plurality of the independent host identifier reading parts.

(A fourth embodiment)

Figure 5:
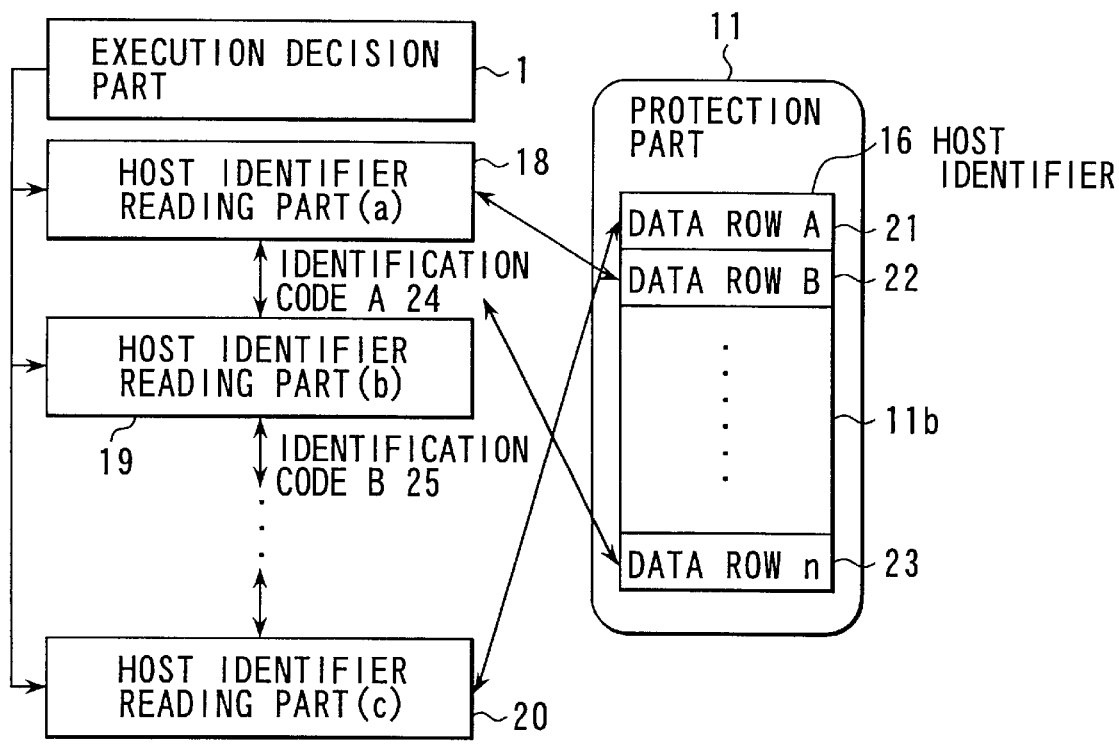
FIG. 5 is a block diagram showing a principal part of a fourth embodiment for execution decision by the execution decision part 1 in FIG. 1.

FIG. 5 is a block diagram showing a principal part of a fourth embodiment for execution decision by the execution decision part 1.

As shown in FIG. 5, the execution decision part 1 provided with "n" number of host identifier reading parts a–n (18–20) decides whether the environment in which the above operation control instructions to each part are executed is an authorized one or not by acquiring the host identifier 16 comprising data rows a–n (21–23) previously retained in the read only nonvolatile memory 11b of the protection part 11 connected to the above computer system unit 15.

In this case, the host identifiers 16 are unique data to guarantee that the environment in which the above operation instructions are executed is an authorized one.

Thereafter, the data rows a–n is formed by dividing the host identifier 16 into "n" number elements, and data rows are sequentially combined, from a data row a, a data row b,—a data row n, to express one host identifier.

Firstly, the execution decision part 1 simultaneously boots up "n" number of the host identifiers reading parts a–n (18–20).

The booted host identifier reading parts 18–20 perform communication with the each host identifier reading part 18–20 to verify whether each host identifier reading parts 18–20 are authorized or not.

For example, the host identifier reading part a18 sends an identification code A24 to the host identifier reading part b19 for the host identifier reading part a18 to identify the host identifier reading part b19, and the host identifier reading part b19 receives the identification code A24 to send an identification code B25 corresponding to the code A24 to the host identifier reading part c. Thereby, it is finally verified each other among host identifier reading parts by receiving appropriate codes in the host identifier reading part a18 that each host identifier reading part 18–20 is authorized.

When it is verified that all the host identifiers reading parts 18–20 is authorized, each host identifier reading part 18–20 sends a request for acquisition of data rows 21–23 of the host identifier 16 to the protection part 11 connected to the I/O port of the above computer system unit 15.

Before the above sending, the execution decision part 1 gives beforehand to each host identification reading parts 18–20 information on which data rows are read from the data rows 21–23 of the host identifier 16 for the side of the protection part 11.

The protection part 11 reads out and sends the data rows 21–23 corresponding to the host identification reading parts 18–20 from the read only nonvolatile memory 11b, according to which data rows 21–23 are required for the host identification reading part 18–20 in the acquisition request.

For the above sending, a dedicated communication means is used for sending and receiving of data between the execution decision part 1 and the protection part 11.

The host identifier reading part 18–20 sends the data rows 21–23 to the execution decision means 1 just after receiving the rows.

In the execution decision means 1, the data rows 21–23 are reconstructed to decide whether the received host identifier 16 is a correct identifier or not. The processing is continued at each part in the computer system unit 15 when it is decided that the identifier 16 is correct, and the processing at each part by the above computer system unit 15 is stopped, when it is decided that the identifier 16 is not correct.

Thereby, in the fourth embodiment, prevention performance against the reverse engineering is improved by simultaneous access and shifting of the order of the data rows.

That is, the above embodiment provides the digital data recording and reproducing system wherein it is verified each other among a plurality of independent host identifier reading parts by mutual identification among them that each host identifier reading part is authorized.

(One of embodiment for personal identification according to the personal identification part 2)

Now, one of embodiments for personal identification according to the above embodiment in FIG. 1 will be described.

Figure 6:
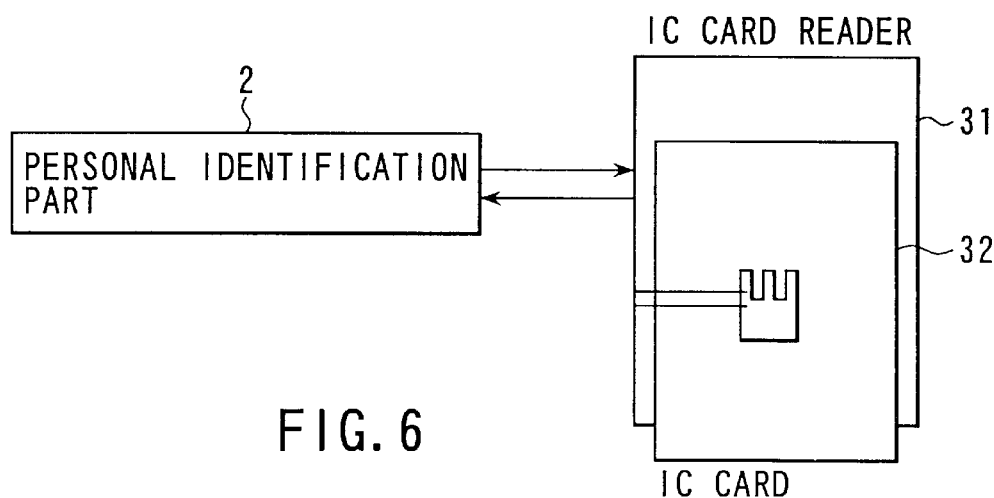
FIG. 6 is a block diagram showing a principal part of a first embodiment for personal identification by the personal identification part 2 in FIG. 1.

(A first embodiment) FIG. 6 is a block diagram showing a principal part of a first embodiment for personal identification by the personal identification part 2.

Figure 7:
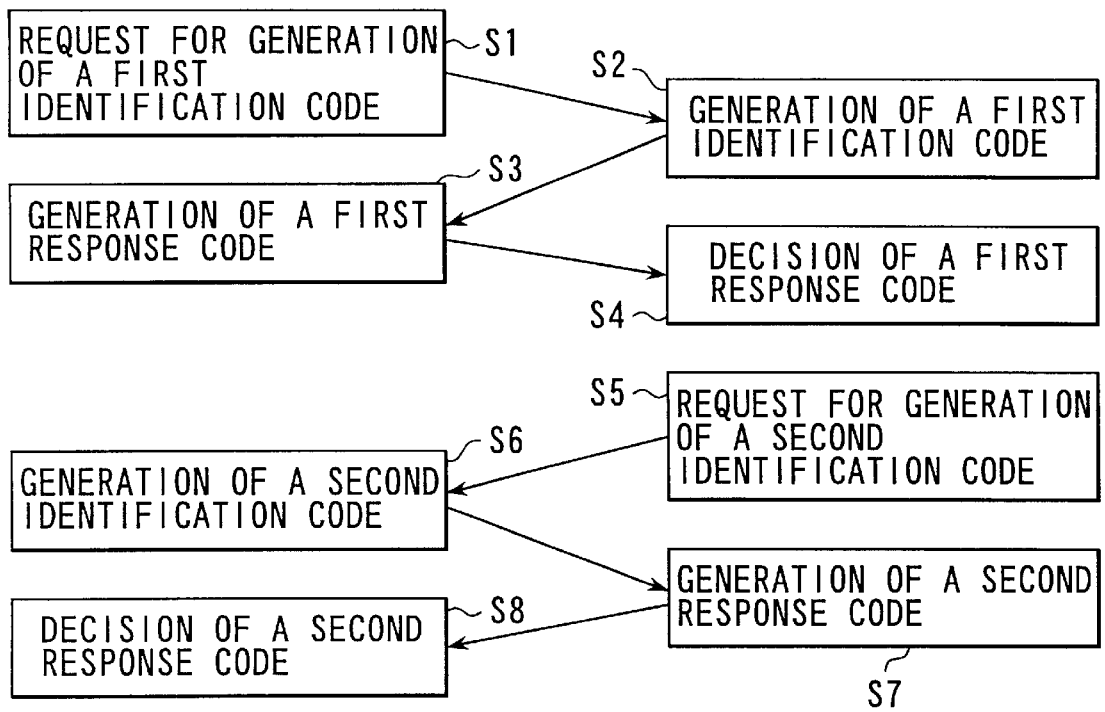
FIG. 7 is a flow chart showing a personal identification procedure for a first embodiment for personal identification by the personal identification part 2 in FIG. 1.

FIG. 7 is a flow chart showing a personal identification procedure for a first embodiment for personal identification by the personal identification part 2.

As shown in FIG. 6, the personal identification part 2 performs identification of users by communicating with an IC card 32 inserted into an IC card reader 31.

The identification procedure will be described based on the flowchart shown in FIG. 7.

Firstly, a request of generation of a first identification code is sent to the IC card 32 from the personal identification part 2 through the IC card reader (readout part) 32 (Step S1).

The IC card 32 receives the request of generation of the first identification code through the IC card reader 31 to generate the first identification card, and to send it to the personal identification part 2 through the IC card reader 31 (Step S2).

When the first identification code is received in the personal identification part 2, the first identification card is generated by a predetermined operation using internal identification keys retained in the IC card 32, and sent to the IC card 32 through the IC card reader 31 (Step S3).

When the IC card 32 receives the first response code through the IC card reader 31, comparison between the first response code and the operation result is performed by a predetermined operation of the first identification code, using external identification keys (Step S4).

A request for generation of a second identification code is sent from the IC card 32 to the personal identification part 2 through the IC card reader 31 (Step S5).

The personal identification part 2 generates a second identification code to send it to the IC card 32 through the IC card reader 31 (Step S6).

In the IC card 32, the second identification code is received through the IC card reader 31, a second response code is generated by a predetermined operation, using an internal identification key retained in the IC card 32, and sent to the personal identification part 2 through the IC card reader 31 (Step S6).

When the personal identification part 2 receives the second identification code, comparisons between the second response code and the operation result is performed by a predetermined operation of the second identification code, using an external identification key (Step S6).

The personal identification part 2 performs personal identification by comparison of the operation results in the above procedures.

That is, the above embodiment provides the digital data recording and reproducing system with the above personal identification part 2 comprising an IC card 32 with identification information written in, and an IC card readout part 3T to read the identification information written on the above IC card, wherein encryption communication is used for communication between the above personal identification part 2 and the IC card readout part 31.

(A second embodiment)

Figure 8:
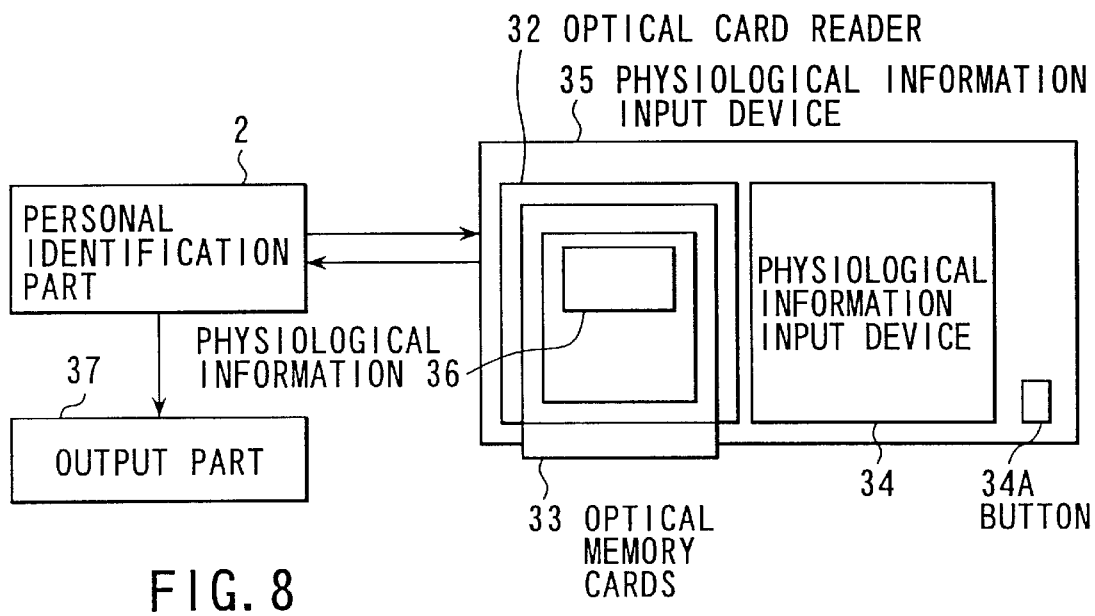
FIG. 8 is a block diagram showing a principal part of a second embodiment for personal identification by the personal identification part 2 in FIG. 1.

FIG. 8 is a block diagram showing a principal part of a second embodiment for personal identification by the personal identification part 2.

As shown in FIG. 8, according to the second embodiment, the personal identification part 2 performs identification of the user by communication with a physiological information input device 35.

The physiological information input device 35 comprises an optical memory card reader 31A to read physiological information 36 written in an optical memory card 33; and a physiological information input part 34 to input live physiological information.

The optical memory card 33 converts the physiological information, for example, into a feature quantity suitable for collation, and further retains it after its encryption.

Personal identification will be described hereinafter, referring to fingerprints as physiological information.

Firstly, the personal identification part 2 displays a message for input request to the output part 37, for example, "Please put your finger on the physiological information input part, and push the button."

The user checks the message to put the finger on the physiological information input part 34, and to push the button 34A. Then, the scanning of the fingerprint on the physiological information input part 34 is started, and scanned data in the physiological information input part 34 is sent to the personal identification part 2.

After completion of the scanning in the physiological information input part 34, the personal identification part 2 receives the physiological information 36 previously written in the optical memory card 33 inserted into the optical memory card reader part 31A as physiological information to guarantee who he or she is.

In the personal identification part 2, the physiological information scanned in the physiological information input part 34 is converted into a feature quantity, and, then, the physiological information 36 sent from the optical memory card 33 is decrypted.

And, in the personal identification part 2, after it is decided by collation of the feature quantity converted from the physiological information scanned in the physiological information input part 34, with the physiological information 36 sent from the optical memory card 33, whether the user is a authorized one or not, the user is permitted to use the related system, only when the user is an authorized user.

That is, the above embodiment provides the digital data recording and reproducing system with the above personal identification part comprising a physiological information input part to input physiological information, wherein personal identification is performed based on physiological information input by the above physiological information input part.

(Embodiments for falsification detection by the falsification detection part 3)

Now, embodiments for falsification detection by the falsification detection part 3 according to the embodiment in FIG. 1 will be described.

(A first embodiment)

Figure 9:
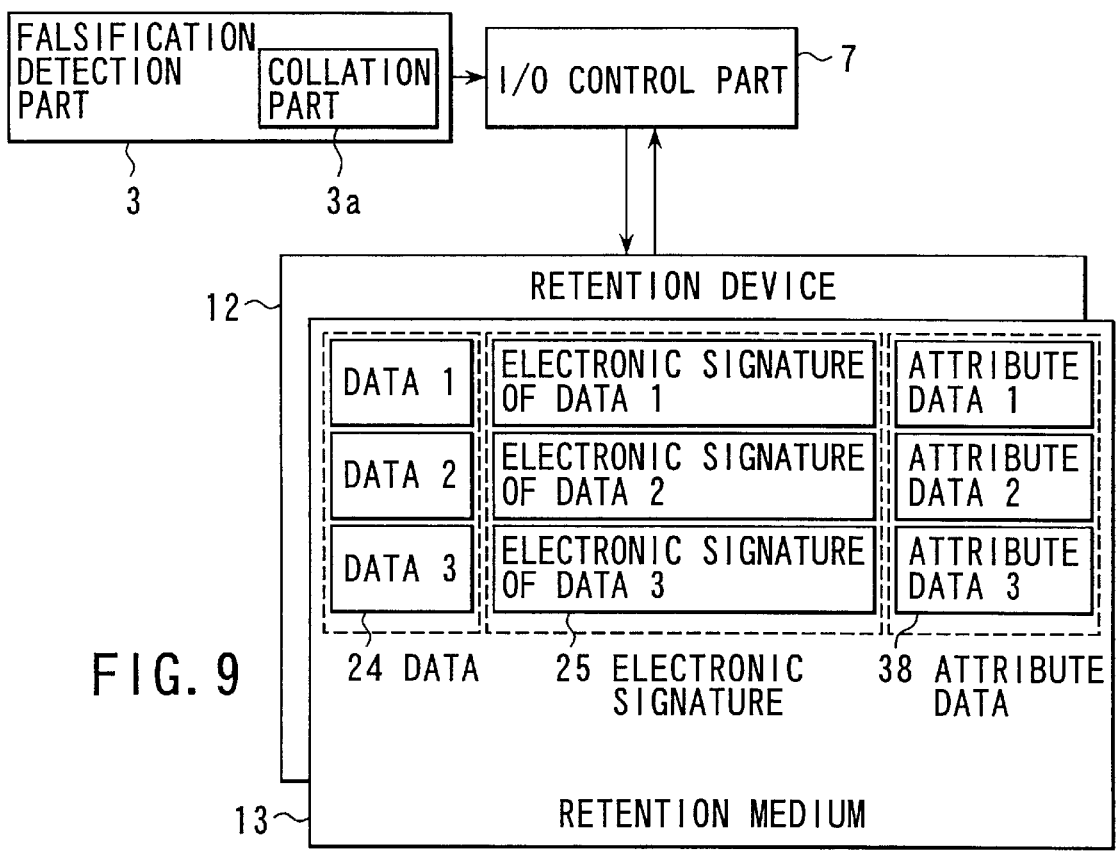
FIG. 9 is a block diagram showing a principal part of a first embodiment for falsification detection by the falsification detection part 3 in FIG. 1.

FIG. 9 is a block diagram showing a principal part of a first embodiment for falsification detection by the falsification detection part 3.

Figure 10:
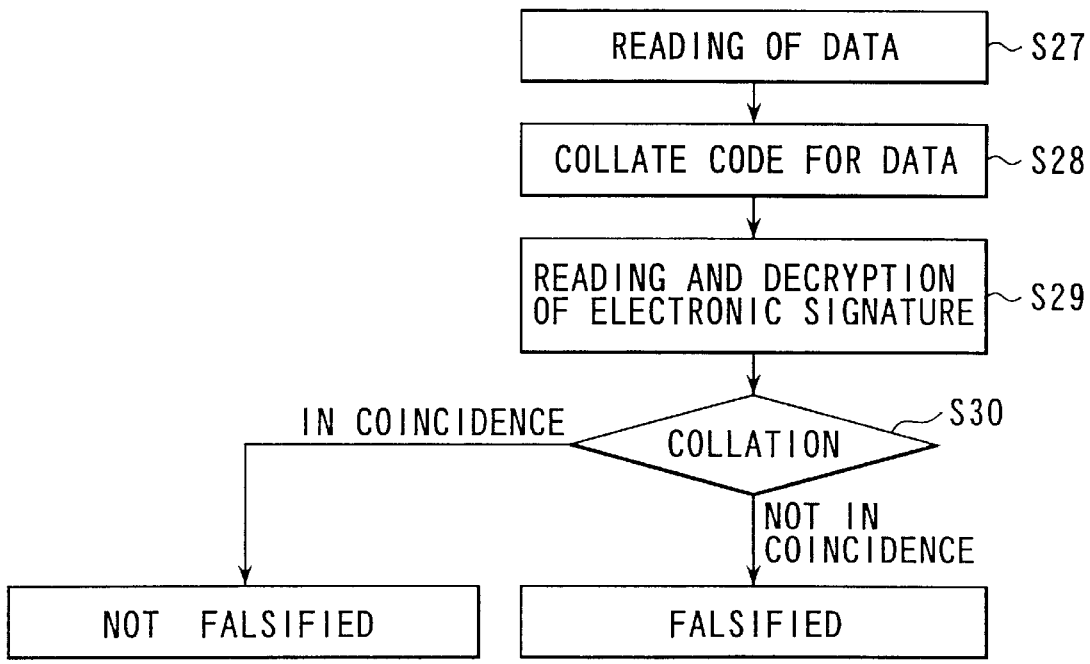
FIG. 10 is a flow chart showing a falsification detection procedure by a first embodiment for falsification detection by the falsification detection part 3 in FIG. 1.

FIG. 10 is a flow chart showing a falsification detection procedure by a first embodiment for falsification detection by the falsification detection part 3.

As shown in FIG. 9, the falsification detection part 3 has a collate part 3a to "collate" each data 24 retained in a retention medium 13 inserted into the retention device 12 through an I/O control means 7.

The collate part 3a of the falsification detection part 3 has a function to detect modifications and deletions of each data 24 retained in the retention medium 13 which the user makes.

Now, the falsification detection procedures for modifications data 1 retained in the retention medium 13 which the user makes will be described, referring to a flowchart shown in FIG. 10.

Firstly, (the collation part 3a of) the falsification detection part 3 reads, through the I/O control means 7, the data 24 in the retention medium 13 inserted into the retention device 12 (Step S27).

Then, the falsification detection part 3 (the collation part 3a of the falsification detection part 3) calculates an electronic signature for the read data 24 (Step S28).

For the above steps, the electronic signature is an identifier uniquely calculated from the content of the data 24. The calculation method is assumed to be decided beforehand.

After completion of calculation of the electronic signature, (the collation part 3a of) the falsification detection part 3 reads, through the I/O control means 7. an electronic signature 25 written in when the data 24 is written into the retention medium 13 (Step S29).

Then, (the collation part 3a of) the falsification detection part 3 collates the calculated collate code with a collate code obtained by decryption of the electronic signature 25 read out from the retention medium 13 (Step 30).

In this case, (the collation part 3a of) the falsification detection part 3 compares the calculated collate code, every unit data, with a collate code obtained by decryption of the electronic signature 25 read out from the retention medium 13, and the collation is completed after termination of comparison among all the data.

(The collation part 3a of) the falsification detection part 3 guarantees that the data retained in the retention medium 13 has not been falsified, when both the above data are in coincidence as a collation result between them. And it detects that the data has been falsified, when they are not in coincidence.

That is, the above embodiment provides the digital data recording and reproducing system, wherein the above falsification detection part 3 comprises the collate part 3a to collate collate code obtained by decryption of the recorded electronic signature 25, for each data file (retention medium 13) in the retention part 12 connected to the above computer system unit 15, with the collate code calculated based on a predetermined calculation method using each data file (retention medium 13) of the above retention part 12.

(A second embodiment)

In the present second embodiment, the principal part of a first embodiment for falsification detection by the falsification detection part 3 has a similar configuration to that of FIG. 9.

In the present second embodiment, the falsification detection procedure by the falsification detection part 3 has the same one as that shown in the flow chart in FIG. 10.

As shown in FIG. 9, the falsification detection part 3 has a collate part 3a to collate all the data 24 retained in the retention medium 13 inserted into the retention device 12 through the I/O control means 7.

In the present second embodiment, the falsification detection part 3 (the collation part 3a of the falsification detection part 3) functions, when the user inserts the retention medium 13 into the retention part 12.

Now, the falsification detection procedures for modifications data 1 retained in the retention medium 13 which the user makes will be described, referring to a flowchart shown in FIG. 10.

Firstly, (the collation part 3a of) the falsification detection part 3 reads, through the I/O control means 7, the data 24 in the retention medium 13 inserted into the retention device 12 (Step S27).

Then, (the collation part 3a of) the falsification detection part 3 calculates the electronic signature for the read data 24 (Step S28).

For the above steps, the electronic signature is an identifier uniquely calculated from the content of the data 24. The calculation method is assumed to be decided beforehand.

After completion of calculation of the collate code, (the collation part 3a of) the falsification detection part 3 reads, through the I/O control means 7. an electronic signature 25 written in when the data 24 is written into the retention medium 13 (Step S29).

Then, (the collation part 3a of the falsification detection part 3 collates the calculated collate code with a collate code obtained by decryption of the electronic signature 25 read out from the retention medium 13 (Step 30).

In this case, (the collation part 3a of) the falsification detection part 3 compares the calculated collate code, every unit data, with a collate code obtained by decryption of the electronic signature 25 read out from the retention medium 13, and the collation is completed after termination of comparison among all the data.

(The collation part 3a of) the falsification detection part 3 guarantees that the data retained in the retention medium 13 has not been falsified, when both the above data are in coincidence as a collation result between them. And it detects that the data has been falsified, when they are not in coincidence.

An attribute data 38 in FIG. 9 is controlled by an attribute control part 6 and a history data retention part 5 described later.

That is, the above embodiment provides the digital data recording and reproducing system, wherein the above falsification detection part 3 comprises the collate part 3a to collate collate code obtained by decryption of the recorded electronic signature, for each data file in the retention part 12 connected to the above computer system unit 15, with the collate code made based on all the data files retained in the above retention part.

(One of embodiments of the history data retention part 5)

Now, one of embodiments of the history data retention part 5 according to the embodiment in FIG. 1 will be described.

Figure 11:
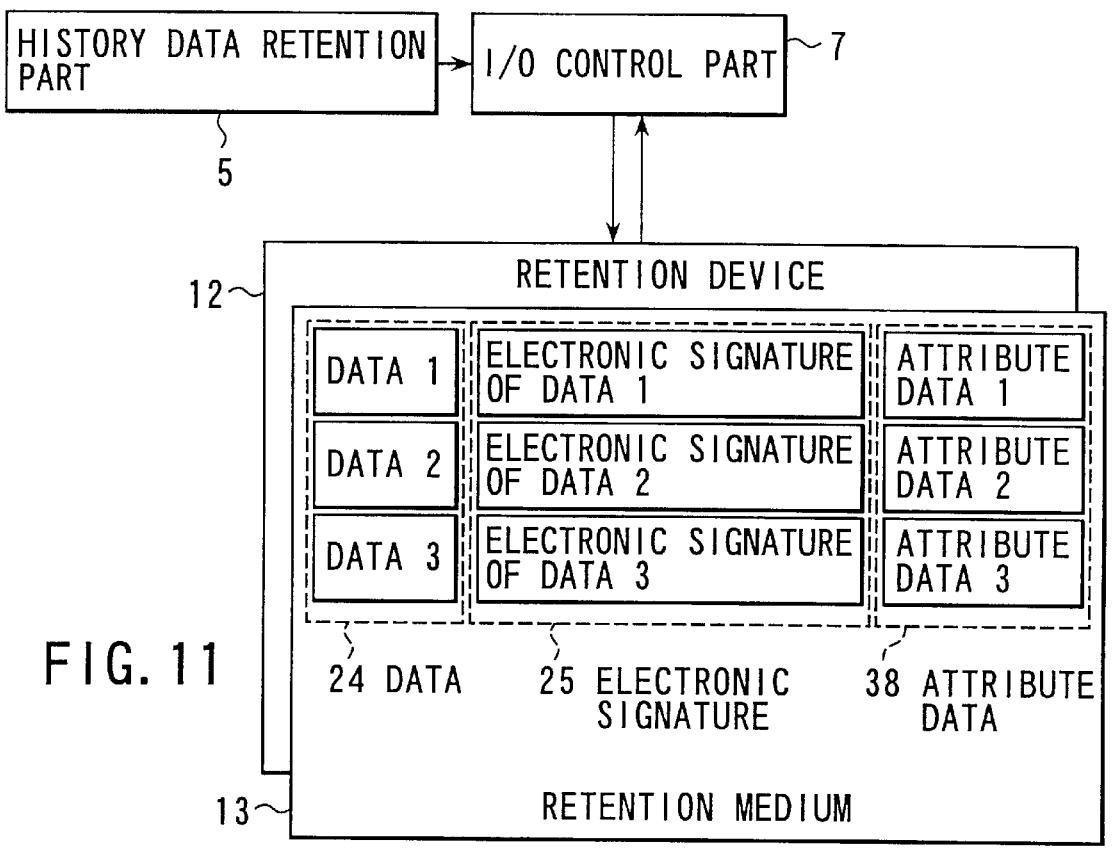
FIG. 11 is a block diagram showing a principal part of one of embodiments of the history data retention part 5 in FIG. 1.

FIG. 11 is a block diagram showing a principal part of one of embodiment of the history data retention part 5.

As shown in FIG. 11, the history data retention part 5 adds a history to an attribute data 38, when each data 24 retained in the retention medium 13 inserted into the retention device 12 is modified and deleted.

In FIG. 11, the attribute data 38 which the history data retention part 5 controls are written into the retention device 12 (retention part), but, they may be written into an external memory, when a mass external memory is provided.

Moreover, the content of the history data includes a user's ID including the user's name to identify the user, the access time denoting the operation time, the access type denoting the kind of the user's operation, the ID of the retention device including the retention device identifier to identify the used retention device (retention part) 12, and the like.

That is, the above embodiment provides the digital data recording and reproducing system, wherein the above history data recording part (retention part) 5 records the user's name to identify the user as history data, the operation time denoting the time when the user performs the operation, the access type denoting the kind of the operation by the user, the retention device identifier to identify the retention device used.

(One of embodiments of the access log recording part 4)

Now, one of embodiments of the access log recording part 4 according to the embodiment in FIG. 1 will be described.

Figure 12:
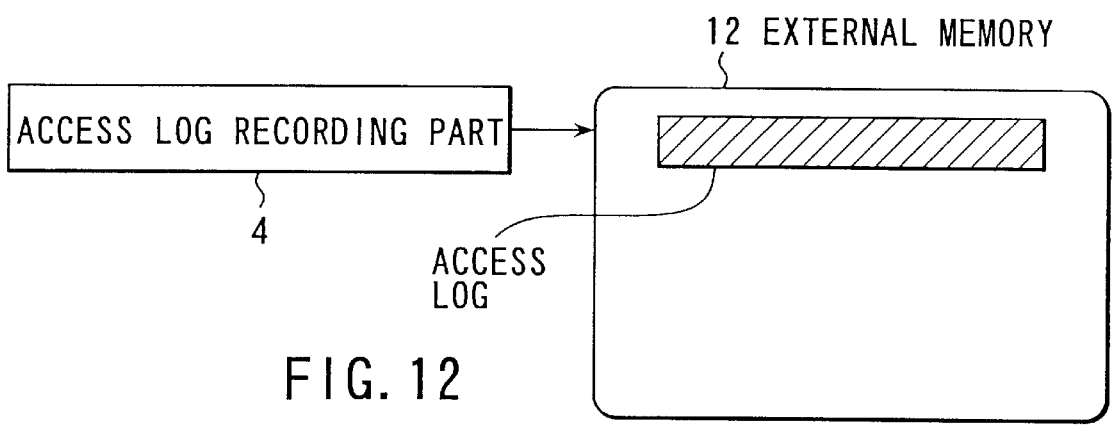
FIG. 12 is a block diagram showing a principal part of one of embodiments of the access log recording part 4 in FIG. 1.

FIG. 12 is a block diagram showing a principal part of one of embodiments of the access log recording part 4.

As shown in FIG. 12, the access log recording part 4 writes the access log in, when the user is permitted to use the related system by the personal identification part 2, or the operation of the related system is terminated.

The access results such as the access time including the start time and termination time of the operation, the user's name to identify the user, and Log-in/Log-out denoting the type of operation start and the operation termination are written into the access log of the external memory 12.

That is, the above embodiment provides the digital data recording and reproducing system, wherein the above access log recording part 4 records the start time and termination time of the operation, the user's name to identify the user, and the type of operation start and the operation termination into the data retention part.

(One of embodiments of the attribute control part 6)

Now, one of embodiments of the attribute control part 6 according to the embodiment in FIG. 1 will be described.

Figure 13:
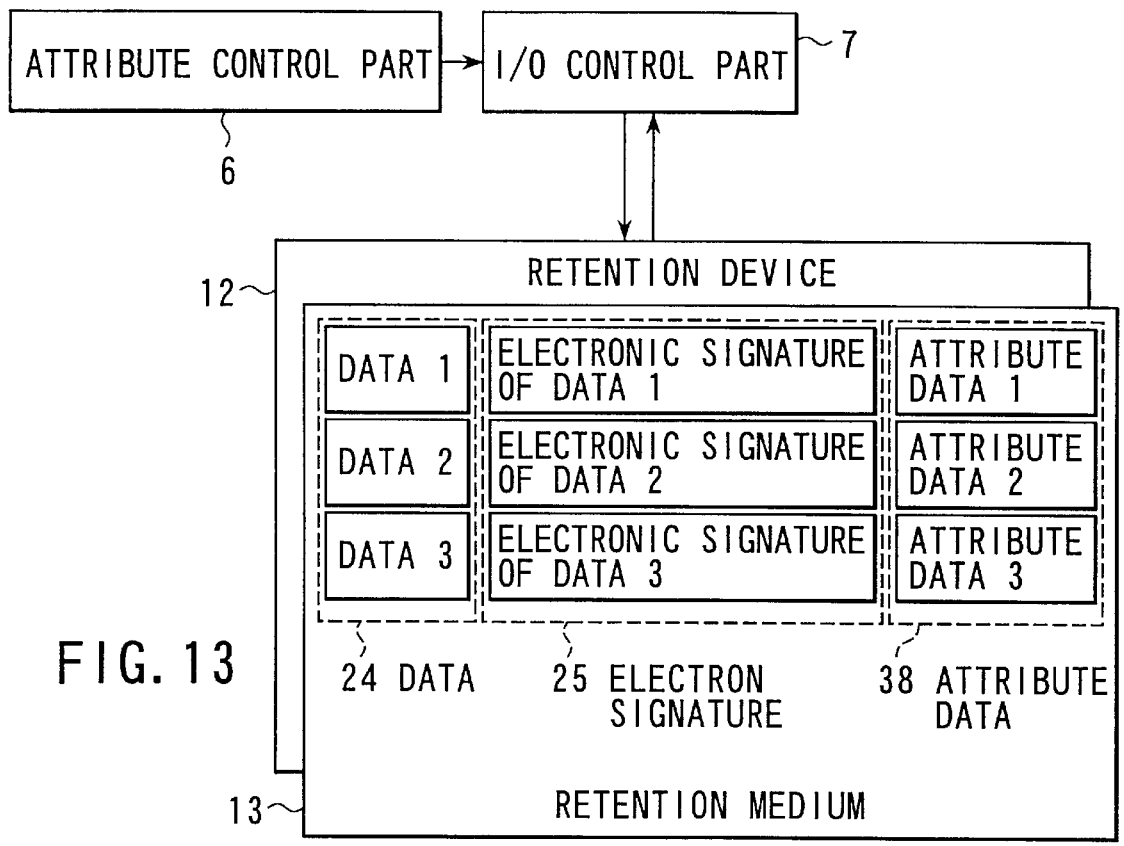
FIG. 13 is a block diagram showing a principal part of one of embodiments of the attribute control part 6 in FIG. 1.

FIG. 13 is a block diagram showing a principal part of one of embodiments of the attribute control part 6 in FIG. 1.

As shown in FIG. 13, the attribute control part 6 updates the attribute data 38, when the user modifies the status of the data.

The content of the attribute data 38 includes the file name, a file type to identify whether the content of the data is of a file type, or of a directory type, the file size, the file attribute denoting the access limitation to the file, the file status denoting whether the file is of an original document type, of a temporarily original document type, of a transcript type, and of an ordinary type, the name of the file maker, the file making time, the maker name of the updated file, the update time of the updated file, the retention time for the file, and the like. As attribute data, at least the original identifier denoting that the data is of an original type, and the backup identifier denoting that the data is of a backup type are required to be included.

That is, the above embodiment provides the digital data recording and reproducing system, wherein the above attribute control part 6 controls as attribute data at least the original identifier denoting that the data is of an original type, and the backup identifier denoting that the data is of a backup type.

(One of embodiments of the I/O control part 7)

Now, one of embodiments of the I/O control part 7 according to the embodiment in FIG. 1 will be described.

(A first embodiment)

Figure 14:
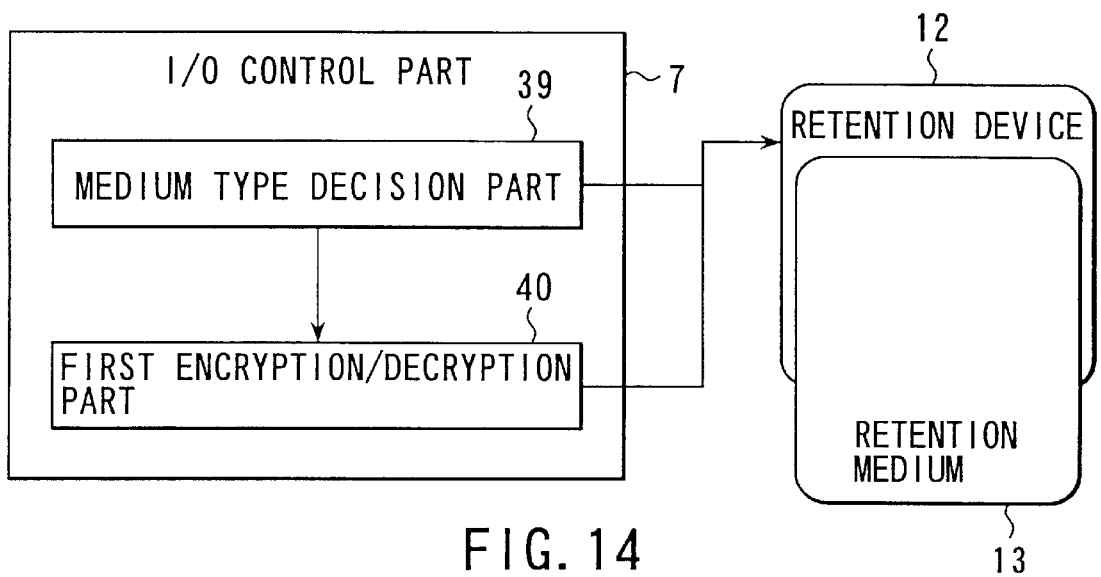
FIG. 14 is a block diagram showing a principal part of a first embodiment of the I/O control part 7 in FIG. 1.

FIG. 14 is a block diagram showing a principal part of a first embodiment of the I/O control part 7 in FIG. 1.

As shown in FIG. 14, the I/O control part 7 defines the input/output procedure of data in the retention medium 13 inserted into the retention device 12 (retention part).

For example, when the user is going to access to the retention medium 13, the medium type decision part 39 in the I/O control part 7 firstly decides whether the retention medium 13 inserted into the retention device (retention part) 12 is of a dedicated retention medium type, or of a general retention medium type.

When the retention medium 13 is of a dedicated retention medium type, data is input and output through a first encryption/decryption part 40 in the I/O control part 7.

Firstly, when the user writes data into the retention medium 13, the first encryption/decryption part 40 functions as an encryption part to encrypt data passing through the part 40 by a predetermined procedure.

Moreover, when the user reads out data from the retention medium 13, the first encryption/decryption part 40 functions as a decryption part to decrypt data passing through the part 40 by a predetermined procedure.

That is, the above embodiment provides the digital data recording and reproducing system with the above control part 8 further comprising the I/O control part 7 to access data in the retention medium 13 of the above data retention part 12, wherein The I/O control part 7 comprises the retention medium identification part 39 to identify the above retention medium, the encryption part 40 to encrypt data information, and the decryption part 40 to decrypt the encrypted data.

(A second embodiment)

Figure 15:
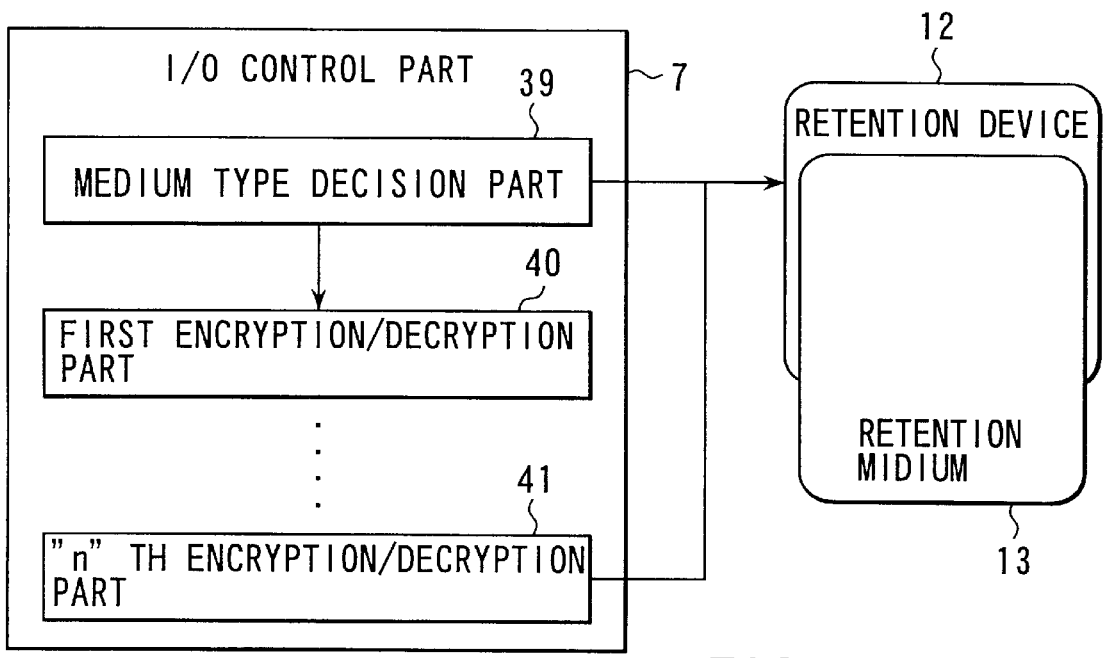
FIG. 15 is a block diagram showing a principal part of a second embodiment of the I/O control part 7 in FIG. 1.

FIG. 15 is a block diagram showing a principal part of a second embodiment of the I/O control part 7.

As shown in FIG. 15, the I/O control part 7 defines the I/O procedure of data in the retention medium 13 inserted into the retention device 12.

For example, when the user is going to access to the retention medium 13, the medium type decision part 39 in the I/O control part 7 firstly decides whether the retention medium 13 inserted into the retention device 12 is of a dedicated retention medium type, or of a general retention medium type.

When the retention medium 13 is of a dedicated retention medium type, data is input and output through from a first encryption/decryption part 40 to a "n"th encryption/decryption part 40 hierarchically configured in the I/O control part 7.

Firstly, when the user writes data into the retention medium 13, the first encryption/decryption part 40 functions as an encryption part to encrypt data passing through the part 40 by a predetermined procedure, and send them to a second encryption/decryption part.

The second encryption/decryption part also functions as an encryption part similarly as the first encryption/decryption part 40, to encrypt data passing through the part by a predetermined procedure, and hierarchically repeat the same operations through the "n"th encryption/decryption part for writing data into the medium 13.

Moreover, when the user reads out data from the retention medium 13, the first encryption/decryption part 40 functions as the first decryption part to decrypt data passing through the part 40 by a predetermined procedure, and send them to the second encryption/decryption part.

The second encryption/decryption part also functions as a decryption part similarly as the first encryption/decryption part 40, to decrypt data passing through the part by a predetermined procedure, and hierarchically repeat the same operations through the "n"th encryption/decryption part for the decryption.

Thereby, in the second embodiment of the I/O control part 7, the data confidentiality may be improved by the hierarchical encryption.

That is, the above embodiment provides the digital data recording and reproducing system, wherein the above encryption part 40 and the above decryption part 40 may control the encryption level by the hierarchical structure.

(One of embodiments of system start)

Now, one of embodiments for system start according to the embodiment in FIG. 1 will be described.

Figure 16:
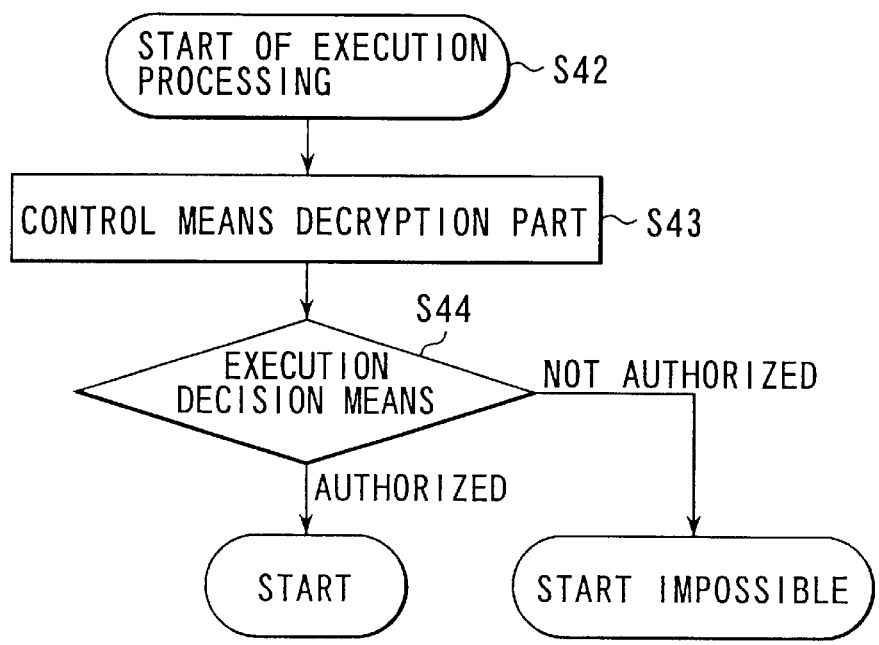
FIG. 16 is a flow chart showing a principal part of one of embodiments for system start of the system in FIG. 1.

FIG. 16 is a flow chart showing a principal part of one of embodiments for system start.

As shown in FIG. 16, when execution start is prompted by the user through the input part 14 (Step S42), the decryption part in the control part 8 decrypts each encrypted part by a predetermined encryption method to cause execution a ready state (Step S43).

Then, it is decided by the execution decision part 1 whether the execution environment of each part is authorized or not (Step S44). When the environment is authorized, the control part 8 is booted up to cause a start-up state, but, when not authorized, the start-up state does not occurred.

(One of embodiments for system end)

Now, one of embodiments for system end according to the embodiment in FIG. 1 will be described.

Figure 17:
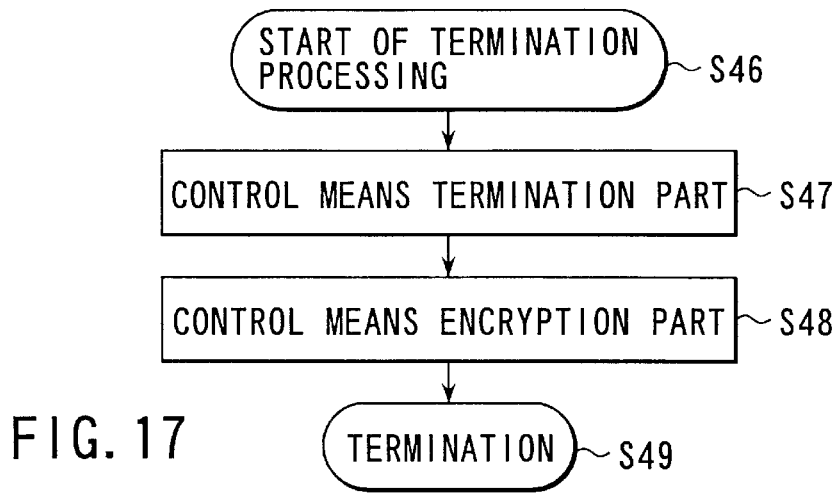
FIG. 17 is a flow chart showing a principal part of one of embodiments for system end of the system in FIG. 1.

FIG. 17 is a flow chart showing a principal part of one of embodiments for system end of the system.

As shown in FIG. 17, after termination of all processing, and execution of termination processing start 46 by the user (Step S46), the end part in the control part 8 is executed to terminate the control part 8 (Step S47).

As the control part 8 terminates, the encryption part in the control part 8 is simultaneously executed to encrypt the control part 8 (Step S48). Thereby, a non-executable state is caused to terminate the system (Step S49).

(One of embodiments of registration processing of new data)

Now, one of embodiments for registration processing of new data according to the embodiment in FIG. 1 will be described.

Figure 18:
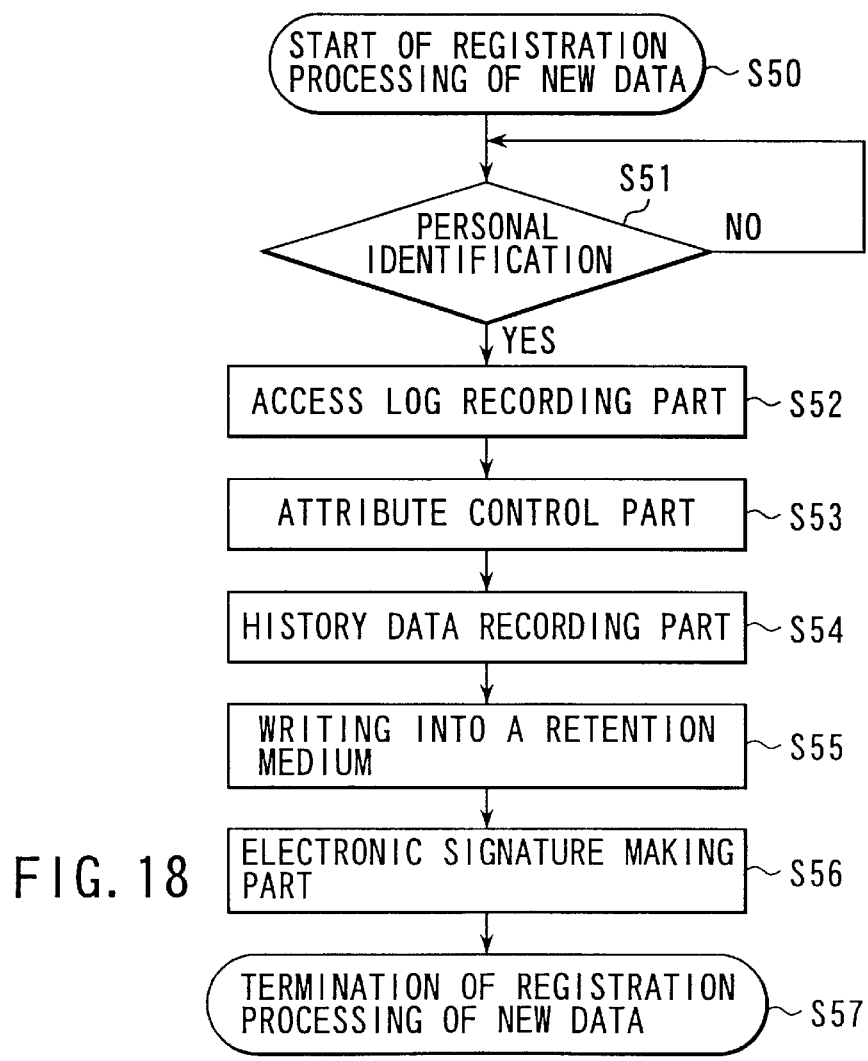
FIG. 18 is a flow chart showing a principal part of one of embodiments for registration processing of new data in the system in FIG. 1.

FIG. 18 is a flow chart showing a principal part of one of embodiments for registration processing of new data in FIG. 1.

As shown in FIG. 18, when the registration processing of new data is started (Step S50), the identification verification of the user is performed in the personal identification part 2 to decide whether the use is authorized or not (step S51).

In FIG. 18, the identification is performed every time, but, once it is executed, it may be eliminated after the second time.

Then, in the access log recording part 4, processing to record information on the user is performed (Step S52).

Thereafter, in the attribute control part 6, processing to record attribute information on data newly recorded is performed (Step S53).

Subsequently, in the history data recording part 5, processing to record history information data is executed (Step S54).

Then, writing data into the retention medium 13 is performed (Step S55), and processing to make an electronic signature for written-in data is executed (Step S56). Thereafter, the registration processing of new data is terminated (Step S57).

In FIG. 18, the processing in the attribute control part 6, the processing in the history data recording part 5, writing-into the retention medium 1, and making the electronic signature are sequentially performed, but, the execution order may be modified, and any order will be accepted.

(One of embodiments of updating of registered data)

Now, one of embodiments for updating of registered data according to the embodiment in FIG. 1 will be described.

Figure 19:
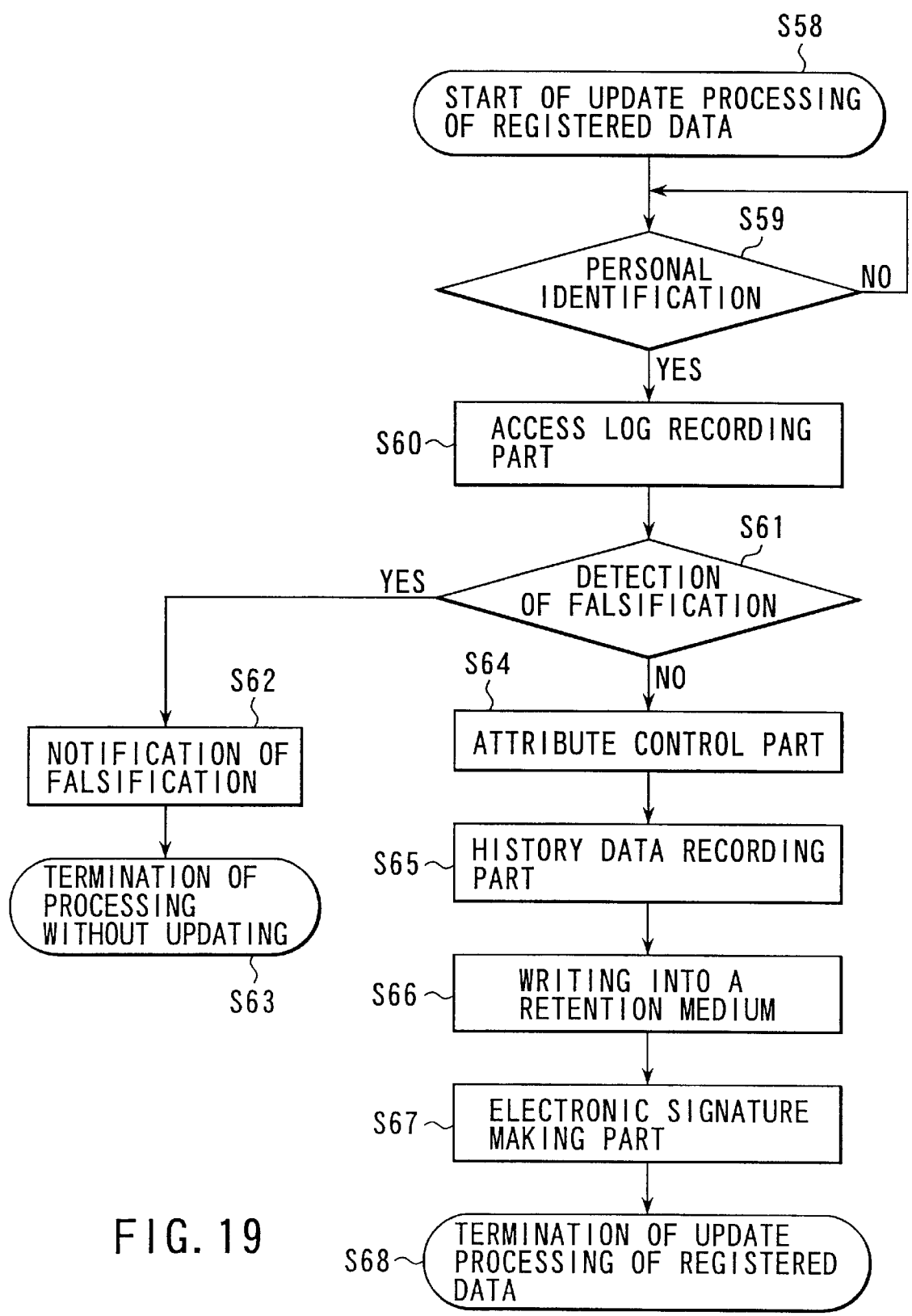
FIG. 19 is a flow chart showing a principal part of one of embodiments for updating of registered data in the system in FIG. 1.

FIG. 19 is a flow chart showing a principal part of one of embodiments for updating of registered data.

As shown in FIG. 19, updating processing of the registered data is started (Step S58), and then the identification verification of the user is performed in the personal identification part 2 to decide whether the user is authorized or not (Step S59).

In FIG. 19, the identification is performed every time, but, once it is executed, it may be eliminated after the second time.

Then, in the access log recording part 4, processing to record information on the user is performed (Step S60).

Thereafter, in the falsification detection part 3, processing to verify that data to be updated is rewritten or modified by illegal user is (Step S61).

When it is verified by the falsification detection part 3 that the data has been rewritten or modified, processing for a falsification notice is performed (Step S62), and it is noticed to the user that the data has been rewritten or modified. Then, the processing is terminated without updating of the data (Step S63).

When it is verified in the falsification detection part 3 that the data has been neither rewritten, nor modified, processing in the attribute control part 6 is executed to record the attribute information on the data to be updated (Step S64).

Thereafter, processing in the history data recording part 5 is performed to record the history information on the data (Step S65).

Subsequently, writing data into the retention medium 13 is executed (Step S66). After processing to make the electronic signature for written data is executed (Step S67), the registered data updating processing is terminated (Step S68).

In FIG. 19, the processing in the attribute control part 6, the processing in the history data recording part 5, writing-into the retention medium 1, and making the electronic signature are sequentially performed, but, the execution order may be modified, and any order will be accepted.

(One of embodiments of deletion of registered data) Now, one of embodiments for deletion of registered data according to the embodiment in FIG. 1 will be described.

Figure 20:
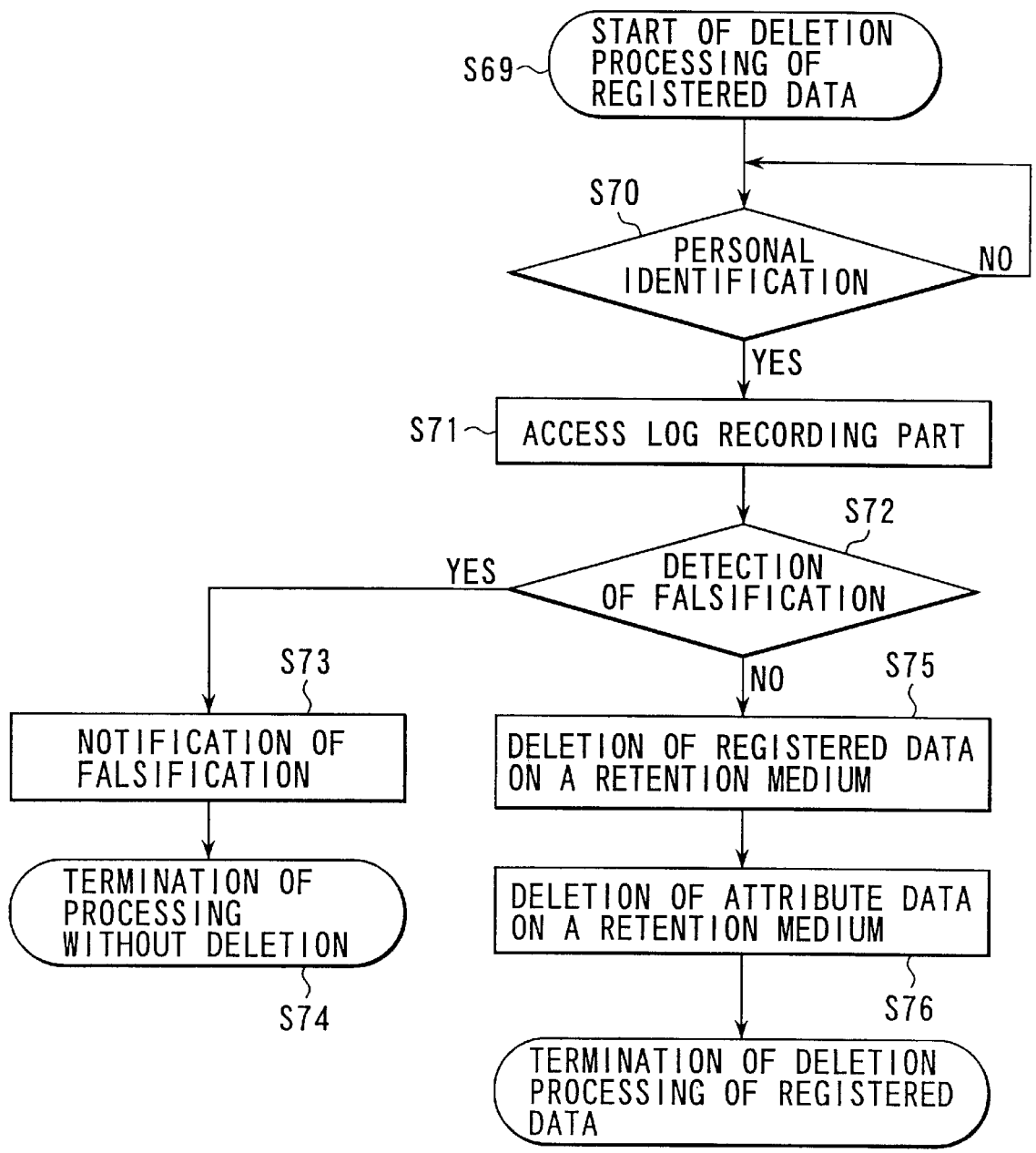
FIG. 20 is a flow chart showing a principal part of one of embodiments for deletion of registered data in the system in FIG. 1.

FIG. 20 is a flow chart showing a principal part of one of embodiments for deletion of registered data.

As shown in FIG. 20, deletion processing of the registered data is started (Step S69), and then the identification verification of the user is performed in the personal identification part 2 to decide whether the user is authorized or not (Step S70).

In FIG. 20, the identification is performed every time, but, once it is executed, it may be eliminated after the second time.

Then, in the access log recording part 4, processing to record information on the user is performed (Step S71).

Thereafter, in the falsification detection part 3, processing to verify that data to be updated is rewritten or modified by illegal user is executed (Step S72).

When it is verified by the falsification detection part 3 that the data has been rewritten or modified, processing for a falsification notice is performed (Step S73), and it is noticed to the user that the data has been rewritten or modified. Then, the processing is terminated without deletion of the data (Step S74).

When it is verified in the falsification detection part 3 that the data has been neither rewritten, nor modified, some pieces of data of all data registered in the retention medium 13 to be deleted are deleted (Step S75).

Then, the data recording the attribute information on the deleted data, and the electronic signature are deleted (Step S76).

(One of embodiments of copying of registered data)

Now, one of embodiments for copying of registered data according to the embodiment in FIG. 1 will be described.

Figure 21:
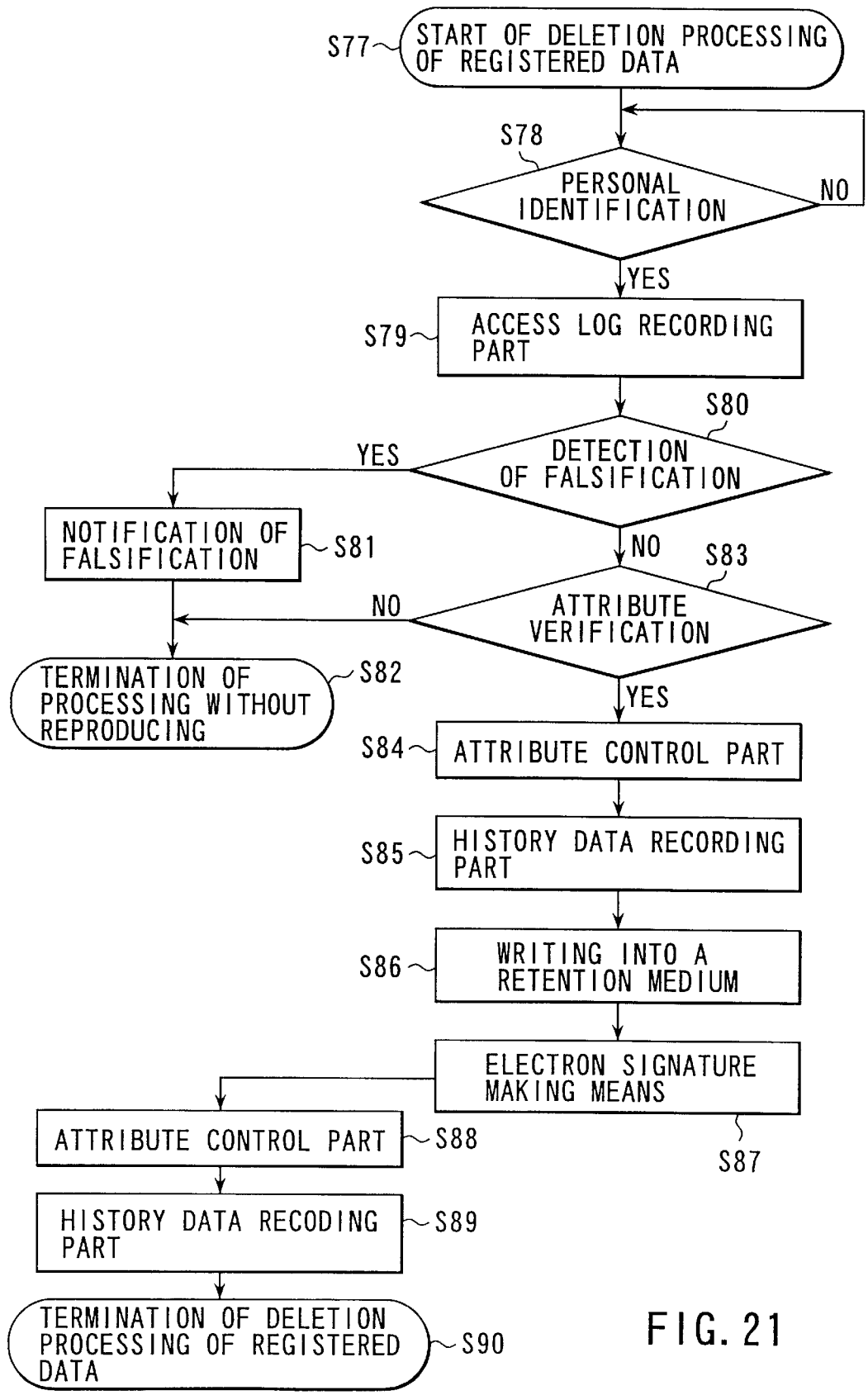
FIG. 21 is a flow chart showing a principal part of one of embodiments for copying of registered data in the system in FIG. 1.

FIG. 21 is a flow chart showing a principal part of one of embodiments for copying of registered data.

As shown in FIG. 21, copying processing of the registered data is started (Step S77), and then the identification verification of the user is performed in the personal identification part 2 to decide whether the user is authorized or not (Step S78).

In FIG. 21, the identification is performed every time, but, once it is executed, it may be eliminated after the second time.

Then, in the access log recording part 4, processing to record information on the user is performed (Step S79).

Thereafter, in the falsification detection part 3, processing to verify that data to be updated is rewritten or modified by illegal user is performed (Step S80).

When it is verified by the falsification detection part 3 that the data has been rewritten or modified, processing for a falsification notice is performed (Step S81), and it is noticed to the user that the data has been rewritten or modified. Then, the processing is terminated without copying of the data (Step S82).

When it is verified in the falsification detection part 3 that the data has been neither rewritten, nor modified, processing in the attribute verification part 6 for data attribute verification is performed (Step S83).

In order to copy data, copied (primitive) data is required to be an original document to require verification of data attributes. When copied data is not an original document, the processing is terminated without copying (Step S82), as it is impossible to perform copying.

However, when the copied (primitive) data is the original document, processing in the attribute control part 6 is performed to record the attribute information on the copied (primitive) data (Step S84).

Thereafter, processing in the history data recording part 5 is performed to record the history information on the data (Step S85).

Subsequently, writing data into the retention medium 13 is executed (Step S86). After processing to make the electronic signature for written data is executed (Step S87), processing in the attribute control pat 6 is performed to record the attribute information on the copied (primitive) data (Step S88).

Then, after execution (Step S89) in the history data recording part 5 to record the history information of the data, the registered data copying processing is terminated (Step S90).

As explained above, according to the present invention, the digital data recording and reproducing system which may be achieved as a low-cost data retention device, and easily operated even without network devices may be offered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital data recording and reproducing system comprising:
   a data input part to input digital data;
   a computer system unit manipulating data input through said data input part as digital data therein; and
   a data output part to output digital data manipulated within said computer system unit,
   wherein said computer system unit comprises at least one of:
      a data retention part to store digital data;
      a personal identification part to verify whether a user operating said digital data recording and reproducing system is authorized or not;
      an access log recording part to record that said user have accessed said data retention part;
      a falsification detection part to detect whether data stored in said data retention part is falsified or not;
      a history data recording part to record information on changes or corrections in data stored in said data retention part; and
      an attribute control part to control attributes of data stored in said data retention part, and
   said computer system unit further comprises:
      a control part to control parts by giving operation instructions to said parts which said computer system unit comprises as component parts, said parts including at least one of said data retention part, said personal identification part, said access log recording part, said falsification detection part, said history data recording part, and said attribute control part; and
      an execution decision part to decide where an environment, in which said operation instructions by said control part to said each parts are executed, is an authorized one or not.

2. A digital data recording and reproducing system according to claim 1,
   said system further comprising a protection part connected to said computer system unit,
   wherein said protection part comprises a read only nonvolatile memory retaining a host identifier to guarantee that the environment in which said operation control instructions are executed is an authorized one, and
   wherein said execution decision part decides whether the environment in which said operation control instructions are executed is an authorized one or not by acquiring said host identifier retained in said read only nonvolatile memory through communication with said protection part.

3. A digital data recording and reproducing system according to claim 2, wherein said execution decision part comprises a plurality of independent host identifier reading parts.

4. A digital data recording and reproducing system according to claim 3, wherein said independent host identifier reading parts verify each other by mutual verification that they are authorized host identifier reading parts.

5. A digital data recording and reproducing system according to claim 1, wherein said execution decision part performs decision in a processing part provided in said computer system unit by reading out said host identifier to guarantee that the environment in which said operation instructions previously written in are executed is an authorized one.

6. A digital data recording and reproducing system according to claim 1, wherein said personal identification part comprises:
   an IC card having identification information written therein; and
   an IC card readout part to read out said identification information written in said IC card, and
   wherein encryption communication is used for communication between the said personal identification part and said IC card readout part.

7. A digital data recording and reproducing system according to claim 1,
   wherein said personal identification part comprises:
      a physiological information input part to input physiological information, and wherein
         personal identification is performed based on said physiological information input by said physiological information input part.

8. A digital data recording and reproducing system according to claim 1,
   wherein said falsification detection part comprises a collate part to collate
      a collate code obtained by decryption of electronic signatures recorded for each data file in said data retention part connected to said computer system unit; with
      a collate code calculated based on a predetermined calculation method using each data:file in said data retention part.

9. A digital data recording and reproducing system according to claim 1,
   wherein said falsification detection part comprises a collate part to collate
      a collate code obtained by decryption of electronic signatures recorded for each data file in said data retention part connected to said computer system unit; with
      a collate code made based on all the data files retained in said data retention part.

10. A digital data recording and reproducing system according to claim 1,
    wherein said access log recording part records in said data retention part:
       start or end time of accesses; a user name to identify the user; and a classification sign denoting the start or the end time of the accesses.

11. A digital data recording and reproducing system according to claim 1,
    wherein said history data recording part records in said data retention part:
       a user name to identify the user as history data; time of the accesses showing when the accesses occur; an access type denoting the type of operation made by the user; and a retention device identifier to specify a retention device used.

12. A digital data recording and reproducing system according to claim 1,
wherein said control part further comprises:
an I/O control part for access to data on a retention medium in said data retention part, and
wherein said I/O control part comprises:
a retention medium identification part to identify said retention medium;
an encryption part to encrypt data information;
a decryption part to decrypt encrypted data.

13. A digital data recording and reproducing system according to claim 12,
wherein
said encryption and decryption parts may respectively control an encryption level by a hierarchical structure.

14. A digital data recording and reproducing system according to claim 1,
wherein said attribute control part controls:
an original identifier showing that data is original at least as attribute data; and
a backup identifier showing that data is backup data.

* * * * *